(12) United States Patent
Boone et al.

(10) Patent No.: US 8,256,511 B2
(45) Date of Patent: Sep. 4, 2012

(54) USE OF A HEAVY PETROLEUM FRACTION AS A DRIVE FLUID IN THE RECOVERY OF HYDROCARBONS FROM A SUBTERRANEAN FORMATION

(75) Inventors: Thomas J. Boone, Calgary (CA); Mori Y. Kwan, Calgary (CA); J. Pierre Lebel, Calgary (CA); Brad C. Harker, Calgary (CA)

(73) Assignee: ExxonMobil Upstream Research Company, Houston, TX (US)

( * ) Notice: Subject to any disclaimer, the term of this patent is extended or adjusted under 35 U.S.C. 154(b) by 415 days.

(21) Appl. No.: 12/600,951

(22) PCT Filed: Jun. 18, 2008

(86) PCT No.: PCT/US2008/007569
§ 371 (c)(1),
(2), (4) Date: Nov. 19, 2009

(87) PCT Pub. No.: WO2009/014586
PCT Pub. Date: Jan. 29, 2009

(65) Prior Publication Data
US 2010/0155062 A1   Jun. 24, 2010

(30) Foreign Application Priority Data
Jul. 24, 2007 (CA) .................................. 2594626

(51) Int. Cl.
| E21B 43/16 | (2006.01) |
|---|---|
| E21B 43/24 | (2006.01) |
| E21B 43/34 | (2006.01) |
| E21B 43/40 | (2006.01) |
| C09K 8/58 | (2006.01) |
| C09K 8/592 | (2006.01) |

(52) U.S. Cl. ...... 166/266; 166/267; 166/271; 166/272.1; 166/272.2; 166/272.3; 166/272.4; 166/272.6; 166/303; 166/400; 166/401; 507/232; 507/936

(58) Field of Classification Search .................. None
See application file for complete search history.

(56) References Cited

U.S. PATENT DOCUMENTS
2,423,674 A * 7/1947 Agren ..................... 166/272.2
(Continued)

FOREIGN PATENT DOCUMENTS
CA   1 266 429   3/1990
(Continued)

OTHER PUBLICATIONS
English translation of RU 2 280 761, 6 pages.
(Continued)

*Primary Examiner* — George Suchfield
(74) *Attorney, Agent, or Firm* — ExxonMobil Upstream Research Company-Law Department (57) ABSTRACT

A process is disclosed for using heavy petroleum fraction as a drive fluid in the recovery of hydrocarbons from a subterranean formation. The hydrocarbons may be in the form of bitumen or heavy oil. The heavy petroleum fraction may be injected into at least one injection well and hydrocarbons produced out of at least one distinct production well. The heavy petroleum fraction may be co-injected together with steam and/or hot water and/or solvent. The heavy petroleum fraction may be a heavy fraction of a process used to upgrade crude oil, such as a heavy asphaltene fraction produced from solvent deasphalting crude oil produced by this recovery process.

27 Claims, 7 Drawing Sheets

U.S. PATENT DOCUMENTS

| | | | | |
|---|---|---|---|---|
| 3,061,009 | A * | 10/1962 | Shirley | 166/303 |
| 3,240,272 | A * | 3/1966 | Orkiszewski | 166/400 |
| 3,554,285 | A * | 1/1971 | Meldau | 166/258 |
| 3,881,550 | A * | 5/1975 | Barry | 166/272.6 |
| 4,007,785 | A | 2/1977 | Allen et al. | |
| 4,017,383 | A * | 4/1977 | Beavon | 208/309 |
| 4,113,013 | A | 9/1978 | Ledoux et al. | |
| 4,344,485 | A | 8/1982 | Butler | |
| 4,550,779 | A * | 11/1985 | Zakiewicz | 166/248 |
| 5,097,903 | A * | 3/1992 | Wilensky | 166/266 |
| 5,425,422 | A * | 6/1995 | Jamaluddin et al. | 166/267 |
| 5,502,267 | A | 3/1996 | Aubert | |
| 5,899,274 | A | 5/1999 | Frauenfeld et al. | |
| 6,357,526 | B1 * | 3/2002 | Abdel-Halim et al. | 166/272.3 |
| 6,364,019 | B1 | 4/2002 | Aggour et al. | |
| 6,662,872 | B2 | 12/2003 | Gutek et al. | |
| 6,708,759 | B2 | 3/2004 | Leaute et al. | |
| 7,128,153 | B2 | 10/2006 | Vinegar et al. | |
| 7,338,924 | B2 | 3/2008 | Varadaraj | |
| 2005/0211434 | A1 | 9/2005 | Gates et al. | |
| 2007/0034550 | A1 | 2/2007 | Hedrick et al. | |

FOREIGN PATENT DOCUMENTS

| | | |
|---|---|---|
| CA | 2 285 255 A1 | 7/1999 |
| CA | 2 279 876 A1 | 2/2000 |
| CA | 2 279 874 A1 | 6/2000 |
| CA | 2 405 493 C | 8/2007 |
| RU | 2129657 C1 | 5/1997 |
| RU | 2 172 764 C1 | 8/2001 |
| RU | 2 280 761 C2 | 11/2005 |

OTHER PUBLICATIONS

McKetta, J. J., *Petroleum Processing Handbook*, 1992, pp. 248-249, 251, 309, 367-368, 490, 527-529, 544-545, 559-560, 595, Chapter 3, Marcel Dekker, Inc, New York.

* cited by examiner

USE OF A HEAVY PETROLEUM FRACTION AS A DRIVE FLUID IN THE RECOVERY OF HYDROCARBONS FROM A SUBTERRANEAN FORMATION

CROSS REFERENCE TO RELATED APPLICATIONS

This application is the National Stage of International Application No. PCT/US2008/007569, filed 18 Jun. 2008, which claims priority from Canadian Patent Application number 2,594,626 which was filed on 24 Jul. 2007, which is incorporated herein by reference.

FIELD OF THE INVENTION

The present invention relates generally to the recovery of hydrocarbons from a subterranean formation.

BACKGROUND OF THE INVENTION

Commonly, heavier hydrocarbons known as heavy oil or bitumen are produced from subterranean formations using in-situ enhanced recovery processes that reduce the viscosity of the hydrocarbons enabling them to flow to the wells; otherwise, economic production rate would not be possible. Examples of commercial in situ enhanced recovery processes are discussed further below. When produced heavy oil or bitumen is shipped to market through pipelines without further processing, it is typically mixed with lighter less viscous oils or diluents to reduce its viscosity to meet pipeline shipping specifications. Various upgrading processes may be used to separate the crude oil into a lighter, less viscous fraction and a heavier, more viscous fraction or heavy petroleum fraction. If crude oil is upgraded on the production site, the lighter fraction is the more valuable fraction of the oil and can meet pipeline specifications without the addition of diluent or at least with reduced diluent requirement.

The heavy petroleum fraction has typically had very limited economic value due to very restricted markets. Thus, a challenge is to create value from the heavy petroleum fraction.

Commercial in situ processes to recover heavier hydrocarbons from subterranean formations exploit at least one of temperature, pressure, and a solvent to reduce the viscosity or otherwise enhance the flow of viscous hydrocarbons within the formation. Various in situ enhanced recovery processes are known including CSS (Cyclic Steam Stimulation), CSD (Constant Steam Drainage), SAGD (Steam Assisted Gravity Drainage), SA-SAGD (Solvent Assisted-Steam Assisted Gravity Drainage), VAPEX (Vapor Extraction), LASER (Liquid Addition to Steam for Enhancing Recovery), SAVEX (Combined Steam and Vapor Extraction Process), water flooding, and steam flooding.

An example of SAGD is described in U.S. Pat. No. 4,344,485 (Butler). An example of VAPEX is described in U.S. Pat. No. 5,899,274 (Frauenfeld). An example of LASER is described in U.S. Pat. No. 6,708,759 (Leaute et al.). An example of SAVEX is described in U.S. Pat. No. 6,662,872 (Gutek).

In certain processes, such as in CSS (Cyclic Steam Stimulation), the same well is used both for injecting a fluid and for producing oil. In CSS, cycles of steam injection, soak, and oil production are employed. Once the production rate falls to a given level, the well is put through another cycle of injection, soak and production.

In other processes, such as in SAGD (Steam Assisted Gravity Drainage), a dedicated injection well and a dedicated production well are used.

Another in situ enhanced recovery process is water flooding which involves injecting water into a reservoir, typically through a dedicated injection well. The water serves to displace the oil in the reservoir to a dedicated production well. However, when water flooding is applied to displace viscous heavy oil from a formation, the process is inefficient because the oil mobility is much less than the water mobility. The water quickly channels through the formation to the production well, bypassing most of the oil and leaving it unrecovered. Consequently, there is a need to either make the water more viscous, or use another drive fluid that will not channel through the oil. Because of the large volumes of drive fluid needed, it should be inexpensive and stable under formation flow conditions. For moderately viscous oils (i.e. those having viscosities of approximately 20 to 100 cP), water-soluble polymers have been used to increase the viscosity of the water injected to displace oil from the formation. Water and oil macroemulsions have also been used as drive fluids, and an example of such a process is disclosed in Canadian Patent Application No. 2,405,493 (Bragg et al., published Nov. 1, 2001). The type of process described in that patent application is described as an enhanced oil recovery (EOR) procedure since a significant percentage of oil remains in a subterranean formation after the costs of primary production rise to such an extent that further oil recovery is cost-ineffective.

Another in-situ recovery process similar to water flooding is steam flooding. In steam flooding, steam is injected into the injection well instead of water. Typically, most of the steam condenses in the reservoir so that oil, water and a small fraction of steam is produced from the production well. The heat of the steam reduces the oil viscosity and enables higher heavy oil production rates. Steam flooding of heavy oil, like water flooding of heavy oil, is subject to the challenge that the steam or water tends to finger through to the production well.

In the art, processes using a drive fluid are often referred to as displacement processes. In one prior example, water and oil macroemulsions are used as drive fluids (Canadian Patent Application No. 2,405,493 (Bragg et al., published Nov. 1, 2001)).

Turning now to a known use of a heavy petroleum fraction, U.S. Pat. No. 4,113,013 (Ledoux), issued Sep. 12, 1978, describes a process for producing petroleum from subterranean formations wherein production from the formation is obtained by driving a fluid from an injection well to a production well. The process involves injecting into the formation, via the injection well, asphaltenes as sacrificial agents to inhibit the deposition of chemical recovery agents such as surfactant on the reservoir matrix. The patent describes that normally the process would be carried out by first injecting the asphaltenes into the formation through the injection well and following them with a chemical recovery agent. The chemical recovery agent would then be followed by a drive fluid such as water to push the materials to the production well. The injected asphaltenes may be present in crude oil, may be in solution in a solvent, or may be in a crude oil diluted with solvent. This patent does not describe the use of a heavy petroleum fraction as a drive fluid in the recovery of hydrocarbons from a subterranean formation.

U.S. Pat. No. 4,550,779 (Zakiewicz), issued Nov. 5, 1985, describes a process for recovering hydrocarbons, and especially heavy hydrocarbons, wherein mining liquids are injected at a bottom level and removed at an upper collecting level together with displaced hydrocarbons. The mining liquids are separated from the product hydrocarbons at the well end and re-injected. The mining liquids are light fractions of product cracking or semi-refining carried out in the vicinity of the wellhead, together with inorganic solvents that are injected under pulsating pressure at a temperature not exceeding 100° C. The mining fluids reduce the viscosity of the heavy hydrocarbons. This patent does not describe the use of a heavy petroleum fraction as a drive fluid in the recovery of hydrocarbons from a subterranean formation.

SUMMARY OF THE INVENTION

It is an object of the present invention to obviate or mitigate at least one disadvantage of previous processes.

Generally, the present invention provides a use of a heavy petroleum fraction as a drive fluid in the recovery of hydrocarbons from a subterranean formation. The hydrocarbons may be in the form of bitumen or heavy oil. The heavy petroleum fraction may be injected into at least one injection well and hydrocarbons produced out of at least one distinct production well. The heavy petroleum fraction may be co-injected together with steam and/or hot water and/or solvent. The heavy petroleum fraction may be a heavy fraction of a process used to upgrade crude oil, such as a heavy asphaltene fraction produced from solvent deasphalting crude oil produced by this recovery process.

In a first aspect, the present invention provides a use of a heavy petroleum fraction as a drive fluid in the recovery of hydrocarbons from a subterranean formation. In embodiments of the invention, the following features may be present. The heavy petroleum fraction may be a heavy fraction derived from a process used to upgrade crude oil, a heavy fraction derived from deasphalting crude oil, or a heavy fraction derived from solvent deasphalting crude oil. The use may be for injection of the heavy petroleum fraction into at least one injection well for recovering hydrocarbons out of at least one production well, distinct from the injection well. The heavy petroleum fraction may be injected into the subterranean formation as a liquid. The viscosity of the heavy petroleum fraction may be greater than the viscosity of original formation hydrocarbons at operating conditions. The viscosity of the heavy petroleum fraction may be greater than the viscosity of the original formation hydrocarbons at operating conditions by between 1 and 3 orders of magnitude. The use may be for co-injection of the heavy petroleum fraction with steam, hot water, solvent, or a mixture thereof, into at least one injection well for recovering hydrocarbons out of at least one production well, distinct from the injection well. The co-injection may be in accordance with the following ranges: 10 to 50 wt. % heavy petroleum fraction and 90 to 50 wt. % steam, hot water, solvent, or a mixture thereof. The use may be subsequent to another in situ hydrocarbon recovery process which may involve injection of steam, hot water, solvent, or a mixture thereof. The solvent may be a paraffinic solvent, e.g. propane, butane or pentane. The solvent may be synthetic crude oil, vacuum gas oil, aromatic hydrocarbons, acetone, alcohols, or a mixture thereof. The hydrocarbons may be in the form of bitumen or heavy oil. The heavy petroleum fraction may comprise at least 50% of a total fluid volume used as a drive fluid. The heavy petroleum fraction may be a non-emulsion. The heavy petroleum fraction may be pentane insoluble. The heavy petroleum fraction may be a heavy fraction from solvent deasphalting oil produced from the formation of interest or a surrounding subterranean formation.

In a further aspect, the present invention provides a process for recovering hydrocarbons from a subterranean formation, the process comprising: injecting a heavy petroleum fraction into the subterranean formation for displacing hydrocarbons; and recovering hydrocarbons from the subterranean formation. In embodiments of the invention, the following features may be present. The injection and the recovery may be through distinct wells. A major portion, by weight, of the heavy petroleum fraction may remain in the subterranean formation following hydrocarbon recovery. The injection of the heavy petroleum fraction may be by way of co-injection with steam, hot water, solvent, or a mixture thereof. The co-injection may be alternated with injection of steam, hot water, solvent, or a mixture thereof. The heavy petroleum fraction may be injected at a viscosity of 10,000 to 1 cP. The heavy petroleum fraction may be injected at a temperature of 50 to 350° C. The heavy petroleum fraction may be injected at a pressure of 2 to 12 MPa. The process may further comprise upgrading the recovered hydrocarbons to produce a higher value fraction and a lower value fraction; and using the lower value fraction as the heavy petroleum fraction for injection into the subterranean formation. The upgrading may be solvent deasphalting.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
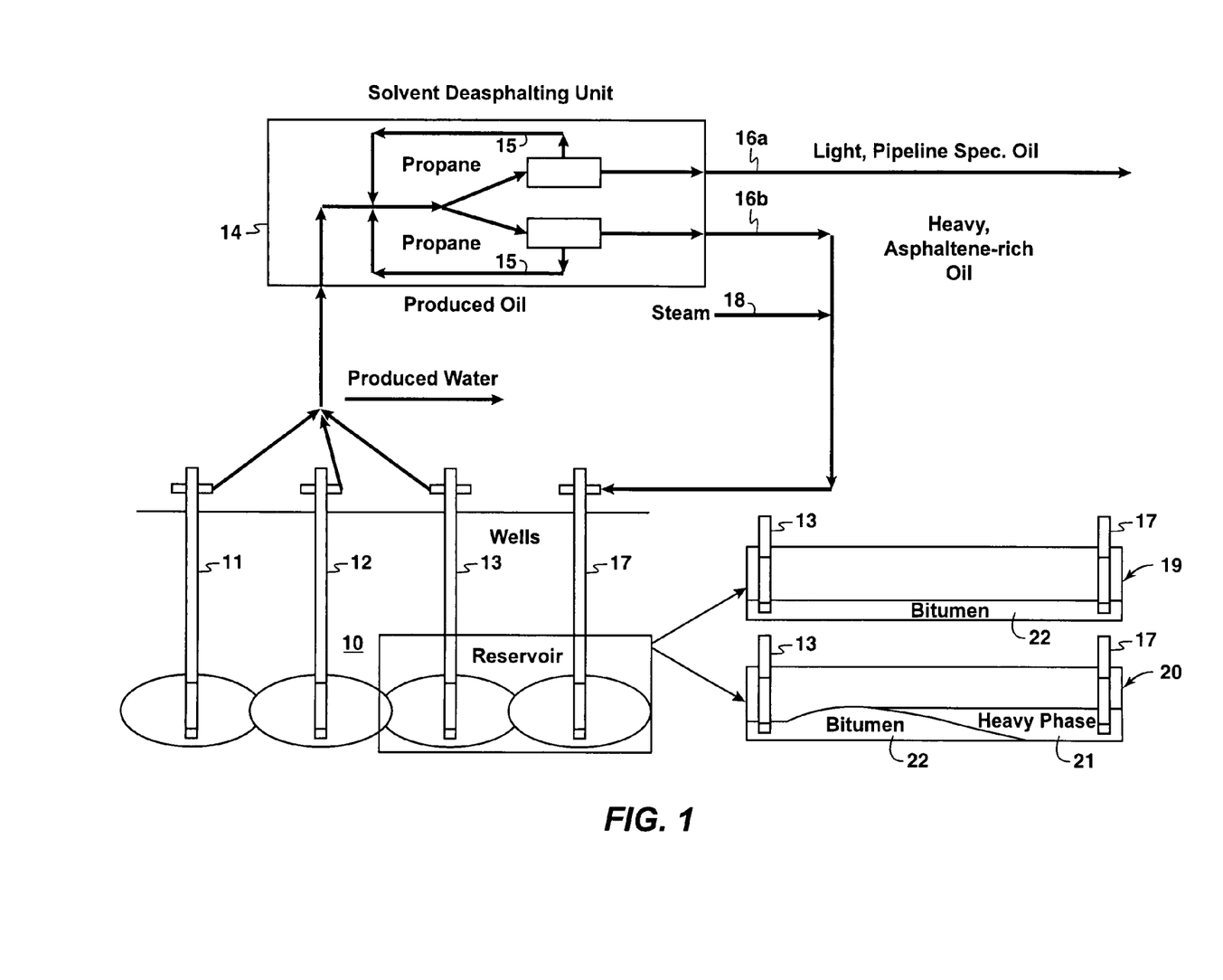
FIG. 1 is a schematic of an embodiment of the instant invention.

Generally, a heavy petroleum fraction is used as a drive fluid in the recovery of hydrocarbons (e.g. bitumen or heavy oil) from a subterranean formation. FIG. 1 is a schematic of an embodiment of the instant invention. As depicted in FIG. 1, oil is produced from a reservoir 10 via three production wells 11, 12 and 13. The produced oil is passed to a solvent deasphalting unit 14. Propane 15 is used as the solvent and is recycled in the process, as shown in FIG. 1. Two streams 16a and 16b leave the solvent deasphalting unit 14: a light, pipeline specification oil (stream 16a); and a heavy, asphaltene-rich oil (stream 16b). The heavy, asphaltene-rich oil is injected into the reservoir via an injection well 17 and is used as a drive fluid in the recovery of hydrocarbons from the subterranean formation. In this embodiment, steam 18 is also used in the recovery and is also injected via the injection well, as shown in FIG. 1. At the bottom-right of FIG. 1, a portion of the reservoir is depicted before (shown as schematic 19) and after (shown as schematic 20) use of the heavy asphaltene-rich oil. As seen in schematic 20, the heavy phase 21 has replaced a portion of the bitumen 22.

The hydrocarbon recovery includes, but is not limited to, recovery of bitumen or heavy oil including, but not limited to, hydrocarbon recovery following primary production (termed enhanced or secondary oil recovery (EOR)). Such recovery includes recovery of hydrocarbon liquids and/or gases.

The heavy petroleum fraction may be from a variety of sources as detailed below. The heavy petroleum fraction may be a relatively low value fraction from recovered oil that is suitable for use as a drive fluid. Suitability is described below. The heavy petroleum fraction may be a heavy fraction from a petroleum upgrading process. As described further below, in an economically advantageous embodiment, a heavy petroleum fraction is injected into a formation for displacing hydrocarbons; hydrocarbons are recovered from the formation; the recovered hydrocarbons are upgraded to produce a higher value (lighter) fraction and a lower value (heavier) fraction; and the lower value fraction is used as the heavy petroleum fraction drive fluid. As a result of this upgrading, the higher value fraction can meet pipeline specifications without the addition of diluents and use is made of the lower value fraction.

By way of background, upgrading or processing of crude oil normally involves separation into various fractions that require further processing in order to produce marketable products. In a modern petroleum refinery, crude oil is separated into various products via their boiling point. First, crude oil is fed into an atmospheric distillation column (ADC), different fractions are boiled off to yield: light naphtha, heavy naphtha (gasoline), kerosene, and atmospheric gas oil (fuel oil) at increasingly higher temperatures. The residuum from the ADC is then fed into a vacuum distillation column (VDC) to yield: vacuum gas oil (which is then fed into a hydrocracker to produce gasoline and fuel oil), heavy vacuum gas oil (lubrication base stock), and asphalt. The residuum from the VDC is then fed into a coker where the heavy fraction is raised to above 500° C. Thermal cracking takes place where lighter products are boiled off to make more gasoline, fuel oil, etc., and some of the heavy stock is thermally converted to coke. The residuum is generally disposed of and has had little commercial value. Generally, the above sequence is called upgrading. Other intermediate processes that balance the yield of gasoline, fuel oil, naphtha, aromatic solvents like toluene and xylene include: hydrocracking, and hydrotreating. Heavy fractions of the above processes are included within "heavy petroleum fraction" as used herein.

Upgrading involves both thermal and chemical reactions. Products of different values and chemical compositions are separated from the feed crude stock. At sufficiently high temperatures (typically>500° C.), crude oil would break down (crack) into vapor (lighter hydrocarbons), liquids and solids. The solids come from thermal conversion of the carbon atoms into coke. Coke is scraped off the reactor wall after conversion.

Another class of separation processes involves mainly chemical reaction. One such process is a deasphalting process, which is effected at relatively low reaction temperature (for instance at less than 100° C.). Deasphalting involves liquid-liquid extraction of the lighter components, usually using a paraffinic solvent such as propane, butane or pentane. The heavier asphaltene fraction is precipitated from the liquid phase to form either a semi-solid or solid flakes. The solvent is recovered by heating the product to a moderate temperature (typically to 50 to 90° C.). Therefore, solvent deasphalting is a process whereby the produced crude oil can be separated into a lighter, less viscous fraction and a heavier, much more viscous fraction. The lighter fraction is the more valuable fraction of the oil and can be designed to meet pipeline specifications without the addition of diluents. A key challenge is to create value from the heavier fraction, which typically comprises asphaltenes and has higher contents of both sulfur and heavy metals. As a result, this fraction has very limited economic value. This heavier fraction is an example of a heavy petroleum fraction as defined herein. In one embodiment, asphaltenes have the following properties: a melting point of approximately 180° C., a viscosity of greater than about 10 million centipoise (cP) at 20° C., a molecular weight of about 1400 or about 1400 and above, C greater than $C_{30+}$ or greater than $C_{100+}$ or greater than $C_{200+}$ (meaning that $C_{30}$, $C_{100}$, or $C_{200}$ will be fractionally distilled, respectively, before the asphaltene fraction). Asphaltene fractions may also be characterized as $C_5$ asphaltene or $C_7$ asphaltene, meaning that the asphaltene fraction is insoluble in pentane or heptane, respectively. Deasphalting is described, for instance, in Chapter 3 of McKetta, J. J., "Petroleum Processing Handbook," Marcel Dekker, Inc, New York, 1992.

Examples, some of which are also mentioned above, of heavy petroleum fractions as defined herein are the heavy fractions formed by the following petroleum upgrading processes: thermal cracking, heavy oil cracking, dehydrogenation, deasphalting, and hydrocracking, all of which are described in Chapter 3 of McKetta, J. J., "Petroleum Processing Handbook," Marcel Dekker, Inc, New York, 1992.

In United States Patent Application No. 2005/0211434 to Gates, et al. a "heavy hydrocarbon solvent" is mentioned and is a $C_5$ to $C_8$ hydrocarbon. While the heavy petroleum fraction described in the instant description differs from such a "heavy hydrocarbon solvent", the heavy petroleum fraction may comprise many components and may include a small or trace amount of $C_5$ to $C_8$ hydrocarbons.

Although bitumen is referred to below, as mentioned above, embodiments of the present invention relate to hydrocarbon recovery including, but not limited to, recovery of bitumen or heavy oil, including, but not limited to, hydrocarbon recovery following primary production (termed enhanced or secondary oil recovery (EOR)) including recovery of hydrocarbon gases. Also, although an asphaltene heavy fraction is referred to below, embodiments of the present invention relate to the use of a petroleum heavy fraction as defined herein, only an example of which is an asphaltene heavy fraction.

In certain bitumen extraction processes, drive fluids with viscosities much lower than the bitumen are injected, such as water and/or steam and/or solvent. This large gap in viscosities of the drive fluid and the hydrocarbons often causes fingers and a "soft front". A drive fluid with a comparable or greater viscosity to the hydrocarbons to be recovered at operating conditions is preferred to reduce fingers and achieve a uniform displacement profile.

Figure 2:
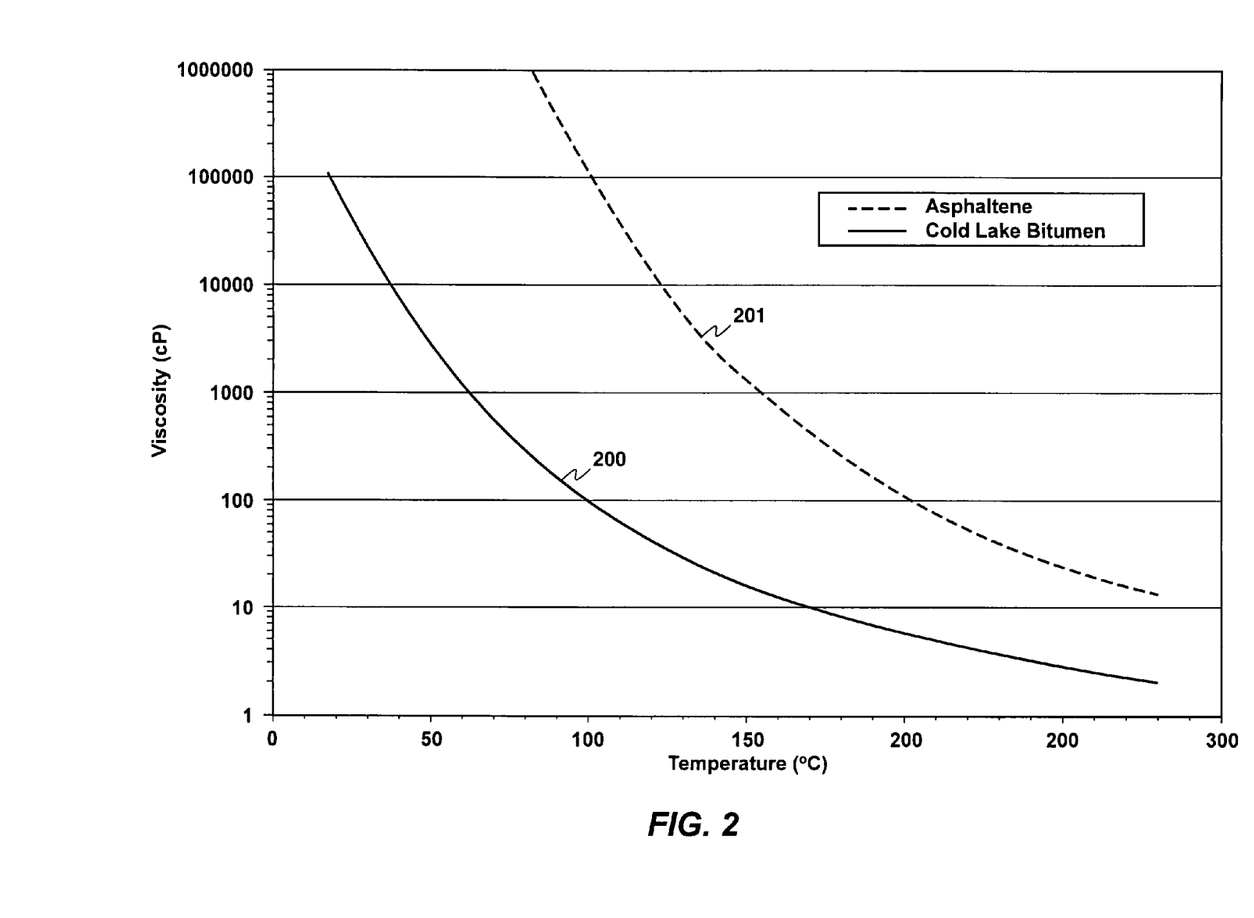
FIG. 2 is a graph showing the viscosity of bitumen and an asphaltene heavy fraction as a function of temperature.

FIG. 2 plots the viscosity of bitumen (line 200) and an asphaltene heavy fraction (line 201) as a function of temperature. This plot illustrates two points. First, the viscosity of an asphaltene heavy fraction at a hot zone reservoir temperature of between 150 and 300° C., ranges between 1000 cP and 10 cP, and can be characterized as a mobile fluid. In many reservoir applications, asphaltenes are perceived to have a high risk of plugging the reservoir, which can occur at lower temperatures, that is, below the melting point of the asphaltenes. Second, the viscosity of the asphaltene heavy fraction ranges from 1 to 1.5 in order of magnitude greater than original reservoir oil at these temperatures. From a reservoir engineering perspective, this ratio is good for the injecting phase with the purpose of displacing the lighter phase (original hydrocarbons in the reservoir) and increasing production of the lighter phase.

The heavy petroleum fraction should be of appropriate viscosity, at operating conditions, to act as a drive fluid. That is, the viscosity of the heavy petroleum fraction, at operating conditions, should be greater than the viscosity of the hydrocarbons within the formation to be displaced, at operating conditions. In one embodiment, the viscosity of the heavy petroleum, at operating conditions, is greater than the viscosity of the hydrocarbons within the formation, by up to 4 orders of magnitude, or by between 1 and 3 orders of magnitude. In different embodiments, the viscosity of the heavy petroleum fraction is about 100,000 to about 1 cP, or about 10,000 to about 1 cP, or about 10,000 to about 10 cP. Such numerical ranges are provided only by way of example and are not limiting on the use or process described herein. While there may be an incentive to inject more viscous hydrocarbons because (i) the process is more efficient and (ii) the value ratio between the displaced and injected fluids increases, the heavy petroleum fraction need only be of appropriate viscosity to act as a drive fluid.

In one embodiment, the heavy petroleum fraction is injected as a liquid. In one embodiment, the heavy petroleum fraction is injected as a slurry. Heavy petroleum fractions from solvent deasphalting processes often turn into solid flakes after the solvent is boiled off the heavy liquid phase. The resulting solid can be mechanically ground into fine particles and mixed with solvent and/or water and/or steam to form a slurry material that is suitable for injection. Depending on the temperature of the mixture, the heavy petroleum fraction and liquid mixture may exist as solid particles in liquid (slurry) or droplets in liquid. Alternatively, solid petroleum fraction particles may be initially mixed with a liquid as a slurry that is subsequently heated to become a liquid mixture. This operational flexibility allows the heavy petroleum fractions to be injected in different applications.

As discussed above, the heavy petroleum fraction should be of appropriate viscosity, at operating conditions, to act as a drive fluid. Of course, temperature affects the viscosity of the heavy petroleum fraction and the injection temperature may be selected to ensure an appropriate viscosity. The injection temperature may also be selected taking into account, for instance, whether solvent and/or hot water and/or steam are used, the temperature of steam injection (if applicable) required based on the injection pressure, and the reservoir conditions. In different embodiments, the heavy petroleum fraction may be injected at a temperature of 50 to 350° C., or 100 to 350° C., or 150 to 300° C. Such numerical ranges are provided only by way of example and are not limiting on the uses or processes described herein.

Likewise, the injection pressure of the heavy petroleum fraction may be selected taking into account, for instance, reservoir conditions, and the conditions of injection of solvent and/or hot water and/or steam. In one embodiment, the heavy petroleum fraction is injected at a pressure of between 1 MPa and at or above fracture pressure, 1 to 14 MPa, 2 to 12 MPa, 6 to 10 MPa, or 7 to 9 MPa, or about 8 MPa. Such numerical ranges are provided only by way of example and are not limiting on the uses or processes described herein. The fracture pressure is also known as the formation parting pressure and is the pressure at which the fluid injection causes the formation or reservoir to part or fracture. The fracture pressure typically increases with the depth of the formation.

In one embodiment, the heavy petroleum fraction is continuously or intermittently injected together with steam and/or hot water and/or solvent into at least one dedicated injection well at a reservoir as part of either a cyclic or continuous process; the heavy petroleum fraction being used as a drive fluid; and the hydrocarbons being produced out of at least one production well. Thus, in one example, steam (optionally with solvent) is continuously co-injected with the heavy petroleum fraction. In another example, injection alternates between steam (optionally with solvent) and co-injection of steam (optionally with solvent) and the heavy petroleum fraction.

Before any heavy petroleum fraction is injected, another in situ process may be employed. Thus, in one example, steam is injected followed by alternating between steam injection and steam and heavy petroleum fraction co-injection.

In one embodiment, 1 to 50 wt. %, or 10 to 50 wt. % heavy fraction is co-injected with 99 to 50 wt. %, or 90 to 50 wt. % hot water and/or steam and/or solvent. Such numerical ranges are provided only by way of example and are not limiting on the uses or processes described herein.

The solvent may be any solvent currently contemplated in hydrocarbon recovery. Examples include: a paraffinic solvent (e.g. propane, butane, or pentane), diluent, naphtha, synthetic crude oil (upgraded bitumen), vacuum gas oil, acetone, aromatic solvents such as toluene and xylene, and alcohols.

SAGD processes usually involve closely spaced injection and production wells and use gravity as the means of flow from the injection well to the production well. Thus, a drive fluid is usually not necessary. Thus, the processes described herein are likely more useful in an in situ process where displacement of the oil is required.

Any of the recovery processes described previously including cyclic steam stimulation, SAGD, water drive, steam drive or primary production, may precede the initiation of the processes described herein. Thus, for example, wells may be initially used for cyclic steam stimulation and then converted into a pattern of dedicated injector wells and producer wells. A drive process utilizing heavy fraction injection may be initiated immediately thereafter or after a period of steam drive injection. In another example, the existing CSS wells may all be converted to dedicated production wells and new dedicated injection wells could be drilled. Injection of a heavy fraction into these wells could occur immediately thereafter or after a period of steam-only injection.

In different embodiments, the process may be useful in vertical or horizontal wells, or in wells of other orientations.

In another embodiment, a heavy petroleum fraction is injected alone into a reservoir (i) before, after, or before and after another in situ process, examples of which are listed above, or (ii) without another in situ process. The heavy petroleum fraction is injected as a liquid and remains as a liquid within the reservoir for a sufficient period of time to act as a drive fluid. Thus, the heavy petroleum fraction injection temperature and the reservoir temperature should be considered. For instance, heavy petroleum fraction injection alone may be best suited for injection into a hot reservoir while reservoirs that are not hot would likely favour heavy petroleum fraction injection together with steam and/or hot water and/or solvent injection, before, during, or after heavy petroleum fraction injection. In other applications involving light or heavy oil in situ processes, a heavy petroleum fraction is injected with steam after steam flooding, water-alternating-gas miscible floods, water flooding and primary cold flow production where fingering, gravity override and fractures would dominate.

Figure 3:
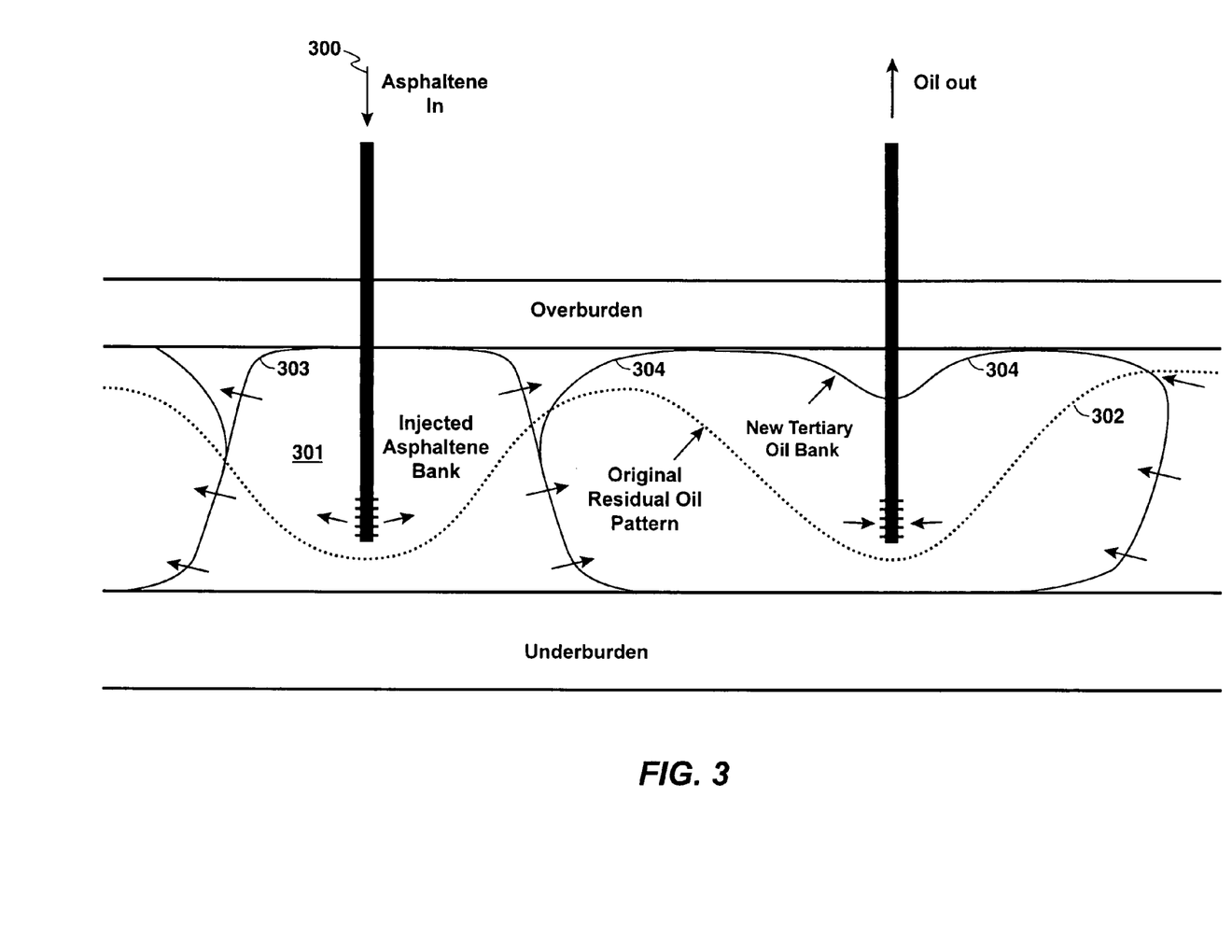
FIG. 3 is a schematic of heavy fraction injection into an oil reservoir previously dominated by gravity override.
Figure 4:
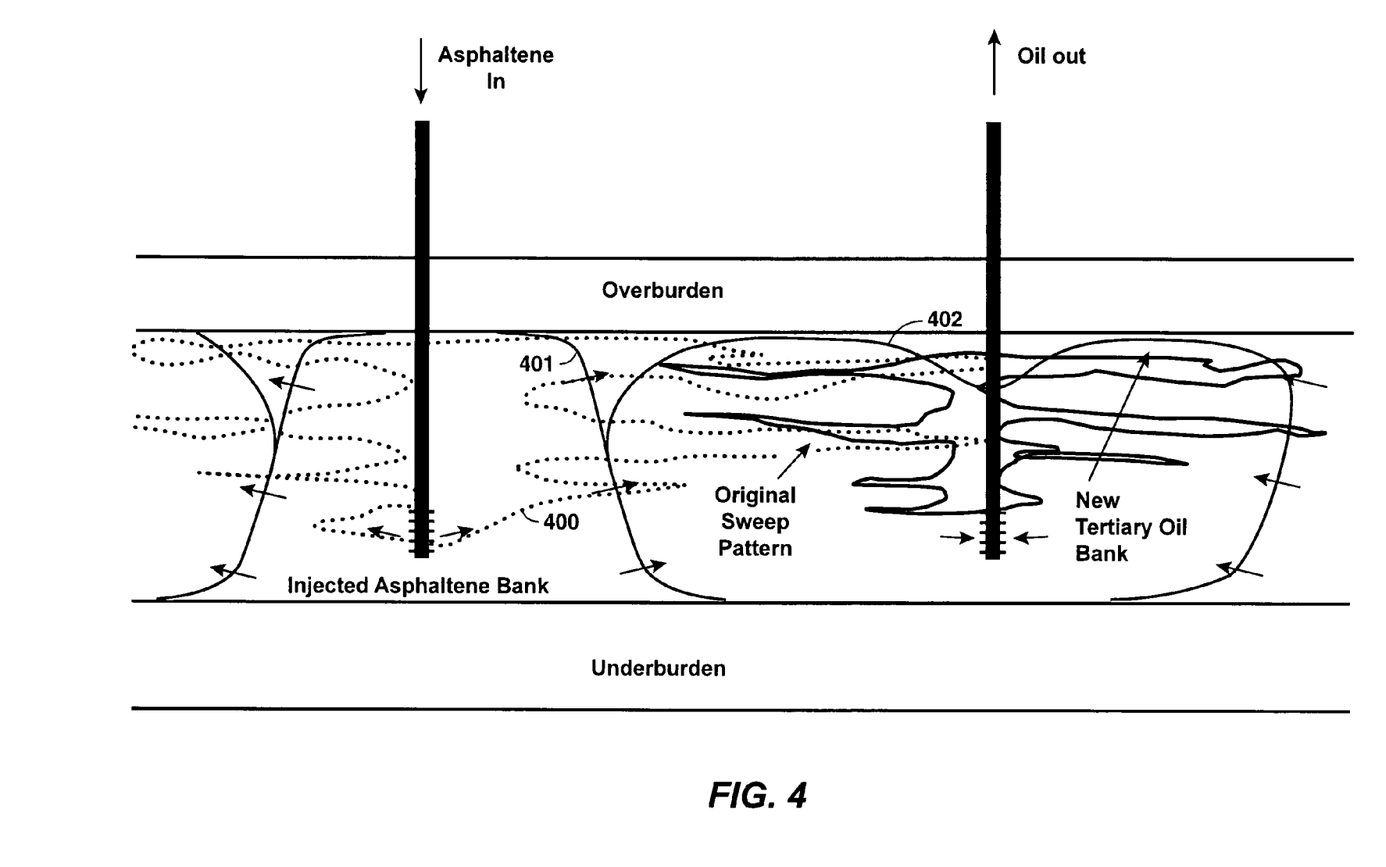
FIG. 4 is a schematic of heavy fraction injection into an oil reservoir previously dominated by viscous fingering and/or fracture.

By using the heavy petroleum fraction, production of hydrocarbons will be increased at the neighboring wells. Without being bound by theory, the increased production is believed to result from two key mechanisms. First, the heavy petroleum fraction will displace the remaining or residual oil in the hot reservoir zone resulting in a bank of mobile native hydrocarbons ahead of the heavy petroleum fraction injection front as illustrated in FIG. 3 is a schematic of heavy petroleum fraction injection 300 into an oil reservoir 301 previously dominated by gravity override. FIG. 3 illustrates the phenomenon of an oil bank that is well understood in petroleum recovery processes. Before the start of the heavy petroleum fraction injection there is a high recovery of the oil above line 302 and relatively low recovery below line 302 due to steam override. After a period of heavy petroleum fraction injection the region below line 303 is largely occupied by the injected heavy petroleum fraction and the region encompassed by line 304 is the new tertiary oil bank. The new tertiary oil bank is occupied primarily by the original petroleum in place and it has been forced into the near wellbore region of the production well thereby making it accessible for production. The second major production mechanism relates to the channeling of steam between injection and production wells. These channels may form for many reasons such as high permeability zones in the rock so they are not typically at the top of the reservoir as in the case of gravity override. In FIG. 4, (FIG. 4 is a schematic of heavy petroleum fraction injection into an oil reservoir previously dominated by viscous fingering and or fracture). Line 400 shows an irregular pattern of these channels of swept zones between an injection and production well. When a heavy petroleum fraction is injected, it will only be mobile in the hot "steam" channels and as a result will tend to impede flow of steam and condensate in those channels and divert it into colder less swept regions As a result, after a period of heavy petroleum fraction injection, an oil bank will be created where oil has been forced into the "steam" channels the area near the production well is largely occupied by the original petroleum enabling it to be produced. In FIG. 4, after a period of heavy petroleum fraction injection, the region below line 401 is largely occupied by the injected heavy petroleum fraction and the region encompassed by line 402 is the new tertiary oil bank.

The fact that most heavy petroleum fractions have a low value is important to the commercial attractiveness of this process, although heavy petroleum fractions with a significant value are nonetheless included with heavy petroleum fractions as used herein.

Scoping reservoir simulations have been run using a state-of-the-art thermal reservoir simulator as described further below. A positive result was that for a well configuration with dedicated injection and production wells, one unit volume of heavy petroleum fraction injection resulted in 0.3 to 0.6 units of incremental hydrocarbon production with most of the heavy petroleum fraction remaining in the reservoir, which is a significant value upgrade. It is believed that one unit volume of heavy petroleum fraction injection could result in up to one incremental unit of hydrocarbon production with most of the heavy petroleum fraction remaining in the reservoir.

The heavy petroleum fraction is a product (or byproduct) of hydrocarbon recovery and upgrading of the recovered oil. Thus, in one embodiment, the heavy petroleum fraction can be re-injected into the original reservoir thereby displacing and enabling increased production of the original crude oil. At typical surface temperatures, many heavy petroleum fractions will solidify and cannot be injected. However, at high temperatures, heavy petroleum fractions will melt and become liquid so that they can, for instance, be co-injected as a mixture with steam or hot water. The economics of the process of an embodiment of the present invention are enhanced through three components: (i) increased bitumen (or other oil) production due to re-injection of the heavy petroleum fraction; (ii) integration with deasphalting processing that reduces diluent blending requirements for shipping the produced oil to market; and (iii) local utilization of the low value heavy petroleum fraction.

Non-limiting examples for the applicability of this process include operations where bitumen or heavy oil is produced through displacement processes, for example in Canada, U.S.A., Chad, Indonesia and Venezuela.

Simulation Results

A model was calibrated to and validated using Cold Lake CSS (Cyclic Steam Stimulation) performance data. Representation of bitumen and asphaltenes was done using two species, one heavier and one lighter. The heavier component was given asphaltene-like properties and the lighter component was given properties consistent with normal bitumen.

The well configuration used represented that of a scheme in which steam is injected into dedicated injection wells and fluids are produced from neighboring wells. Comparisons were made between models using normal steaming operation and models in which asphaltenes are co-injected with the steam.

Figure 5:
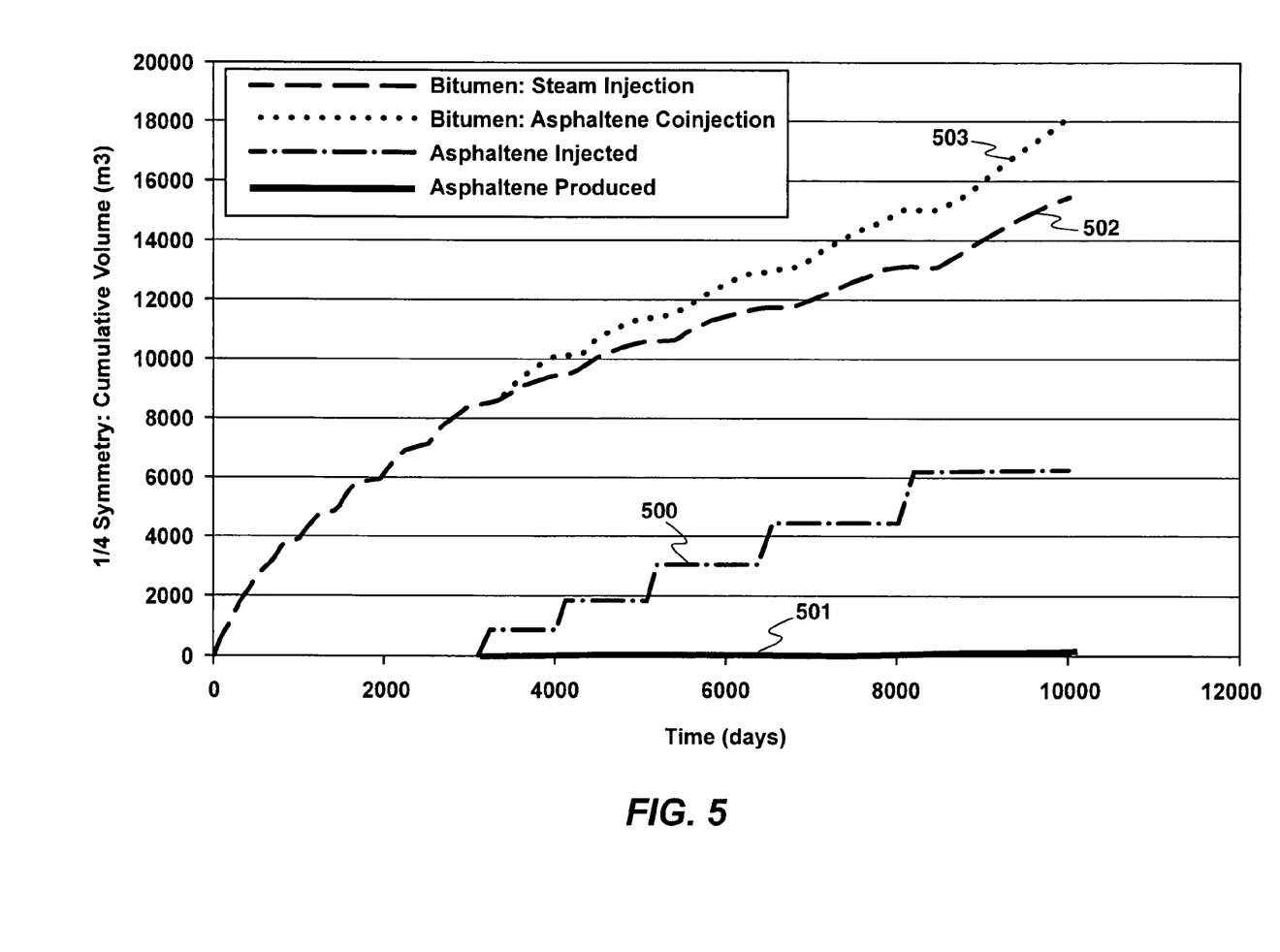
FIG. 5 is a graph showing simulated injection and production volumes.
Figure 6:
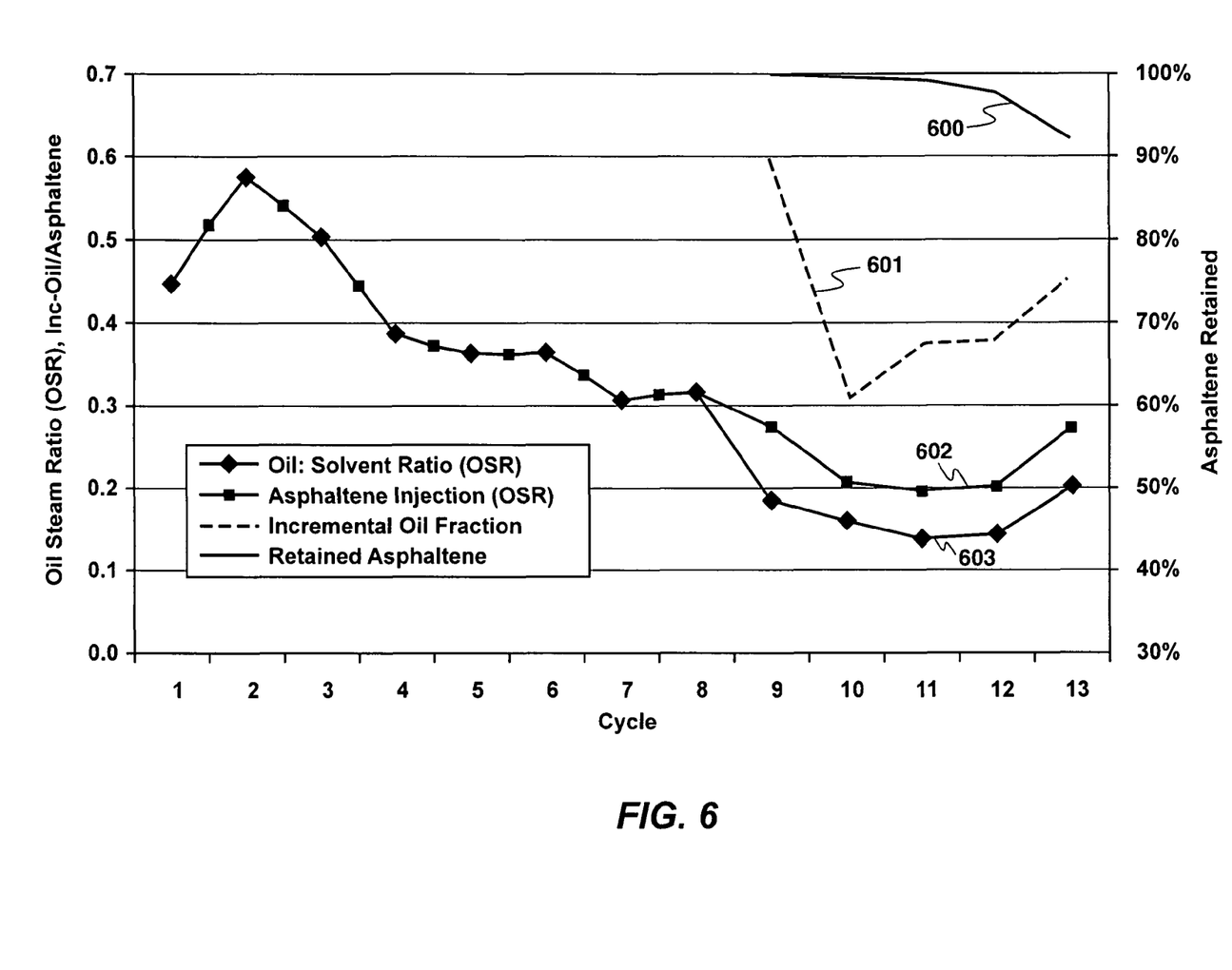
FIG. 6 is a graph showing simulated response to steam and asphaltene injection in an oil sands formation undergoing cyclic steam stimulation.

FIG. 5 shows simulated asphaltene injection volume (shown by number 500), bitumen production volume by steam injection as compared to bitumen production volume by steam and asphaltene co-injection, and asphaltene production volume. The increase in bitumen production of the steam and asphaltene co-injection as compared to the steam injection ranges from 30 to 50 percent in cycles 9 through 13. The asphaltene injection cycles in FIG. 5 are indicated by the "steps" and "plateaus" in its cumulative injected volume curve 500. FIG. 5 shows that during these cycles, there is almost no production of the injected asphaltenes 501. The cumulative bitumen production without asphaltene injection is shown as line 502. The higher cumulative oil production that results with asphaltene injection is shown as line 503. As shown in FIG. 6, the retention of asphaltenes 600 exceeded 97 percent prior to cycle 13. The return of bitumen for asphaltene is shown to exceed 50 percent in the first cycle of injection as illustrated by line 601 in FIG. 6 and averages about 40 percent in subsequent cycles. Line 602 shows the oil to steam ratio for the case with asphaltene injection compared to line 603 for the case without asphaltene injection.

In these simulations, using distinct injection and production wells, one unit volume of heavy petroleum fraction injection resulted in 0.3 to 0.6 units of incremental bitumen production with most of the heavy fraction remaining in the reservoir, which is a significant upgrade. If, on the other hand, the heavy petroleum fraction was injected into a well and that same well was subsequently produced, as commonly done in a CSS operation, most of the heavy petroleum fraction was produced, which is not a desired result.

Figure 7:
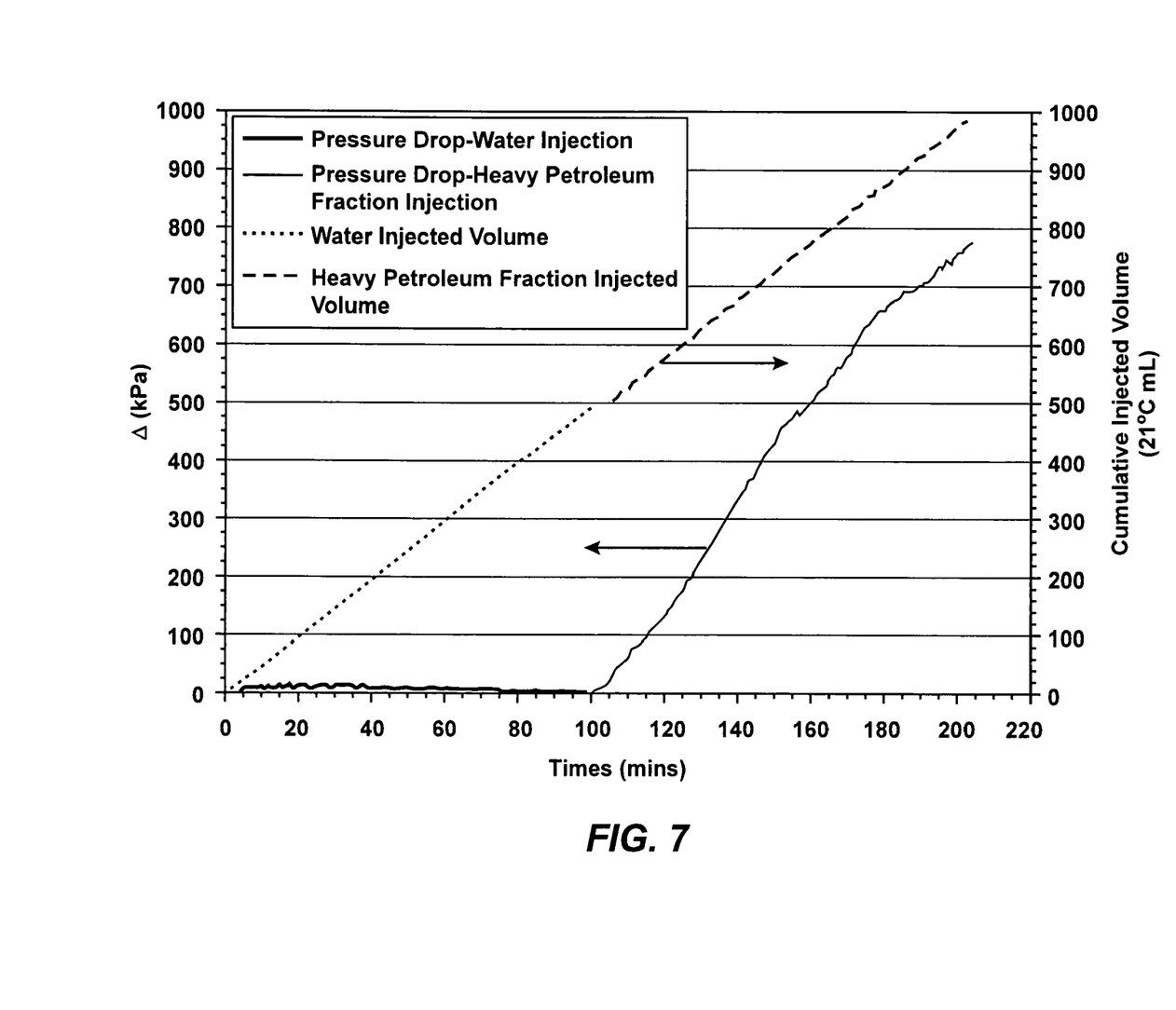
FIG. 7 is a graph showing the pressure drop in a sand pack when hot water and a heavy petroleum fraction at 260° C. were sequentially injected along with the volume of the injected fluids.

FIG. 7 shows the results of a laboratory test in which hot water and a heavy petroleum fraction at 260° C. were injected sequentially into a 0.5-m long cylindrical sand pack with a diameter of 5.6 cm and a permeability that is representative of a typical Cold Lake oil sands formation. The test simulated the displacement of residual bitumen and water from an underground oil sands reservoir that had been previously swept by steam. The heavy petroleum fraction was generated by a solvent deasphalting process applied to the same bitumen that was used to initially saturate the core. The pressure drop data indicated that heavy petroleum fraction behaved like a liquid at the test temperature and had a viscosity of 217 cP.

Near complete displacement of the initial bitumen and water in the sand pack was observed validating the recovery mechanism of the heavy fraction injection concept. Based on a heavy phase viscosity of 217 cP at 260° C., about 200 cubic meters per day of heavy fraction can be injected under a pressure difference of 7 MPa into a 30-m thick 2-darcy formation (typical in Cold Lake). Test results demonstrated that heavy petroleum fractions can be practically injected in commercial quantity and rate into heated oil sands reservoirs and thereby be used as an effective displacement agent.

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. A process for recovering hydrocarbons from a subterranean formation, the process comprising:
   injecting a heavy petroleum fraction derived from deasphalting crude oil into the subterranean formation for displacing hydrocarbons; and
   recovering hydrocarbons from the subterranean formation.

2. The process according to claim 1, wherein the heavy petroleum fraction is a heavy fraction derived from solvent deasphalting crude oil.

3. The process according to claim 1, wherein the process is for injection of the heavy petroleum fraction into at least one injection well for recovering hydrocarbons out of at least one production well, distinct from the injection well.

4. The process according to claim 1, wherein the process is for injection of the heavy petroleum fraction into the subterranean formation as a liquid.

5. The process according to claim 1, wherein the viscosity of the heavy petroleum fraction is greater than the viscosity of original formation hydrocarbons at operating conditions.

6. The process according to claim 1, wherein the viscosity of the heavy petroleum fraction is greater than the viscosity of the original formation hydrocarbons at operating conditions by between 1 and 3 orders of magnitude.

7. The process according to claim 1, wherein the process is for co-injection of the heavy petroleum fraction with steam, hot water, solvent, or a mixture thereof, into at least one injection well for recovering hydrocarbons out of at least one production well, distinct from the injection well.

8. The process according to claim 7, wherein the co-injection is in accordance with the following ranges: 10 to 50 wt. % heavy petroleum fraction and 90 to 50 wt. % steam, hot water, solvent, or a mixture thereof.

9. The process according to claim 7, wherein the solvent is a paraffinic solvent.

10. The process according to claim 9, wherein the solvent is propane, butane or pentane.

11. The process according to claim 10, wherein the solvent is propane.

12. The process according to claim 7, wherein the solvent is synthetic crude oil, vacuum gas oil, aromatic hydrocarbons, acetone, alcohols, or a mixture thereof.

13. The process according to claim 1, wherein the process is subsequent to another in situ hydrocarbon recovery process.

14. The process according to claim 13, wherein the another in situ hydrocarbon process involves injection of steam, hot water, solvent, or a mixture thereof.

15. The process according to claim 14, wherein the another in situ hydrocarbon process involves a cyclic injection of steam, hot water, solvent, or a mixture thereof followed by production of a mixture of the hydrocarbons and the steam, hot water, solvent, or a mixture thereof.

16. The process according to claim 1, wherein the hydrocarbons are in the form of bitumen.

17. The process according to claim 1, wherein the hydrocarbons are in the form of heavy oil.

18. The process according to claim 1, wherein the heavy petroleum fraction comprises at least 50% of a total fluid volume used as a drive fluid.

19. The process according to claim 1, wherein the heavy petroleum fraction is a non-emulsion.

20. The process according to claim 1, wherein the heavy petroleum fraction is pentane insoluble.

21. The process according to claim 1, wherein the heavy petroleum fraction is injected at a viscosity of 10,000 to 1 cP.

22. The process according to claim 1, wherein the heavy petroleum fraction is injected at a temperature of 50 to 350° C.

23. The process according to claim 1, wherein the heavy petroleum fraction is injected at a pressure of 2 to 12 MPa.

24. The process according to claim 1, further comprising:
   upgrading the recovered hydrocarbons to produce a higher value fraction and a lower value fraction; and
   using the lower value fraction as the heavy petroleum fraction for injection into the subterranean formation.

25. The process according to claim 24, wherein the upgrading is solvent deasphalting.

26. The process according to claim 1, wherein the process is for injection of the heavy petroleum fraction into a plurality of injection wells arranged in a pattern for recovering hydrocarbons out of at least one production well.

27. The process according to claim 1, wherein the heavy petroleum fraction is injected at a pressure at or above formation fracture pressure.

* * * * *